3,139,455
PHENOXYACETAMIDOXIMES
Alfred Campbell, Ann Arbor, Mich., assignor to Parke, Davis & Company, Detroit, Mich., a corporation of Michigan
No Drawing. Filed Dec. 18, 1961, Ser. No. 160,337
10 Claims. (Cl. 260—564)

This invention relates to organic compounds and to methods for producing the same. More particularly, the invention relates to amidoxime compounds having the general formula $RO-(CH_2)_n-C(NH_2)=NOR_1$ and acid addition salts thereof; where R represents one of the following aryl groups: phenyl, 3-ethylphenyl, 2,6-xylyl, 2-methoxyphenyl, $\alpha,\alpha,\alpha$-trifluoro-m-tolyl, 4-chloro-o-tolyl, 2-chlorophenyl, 2,3-dichlorophenyl, 2,4-dichlorophenyl and 2,6-dichlorophenyl, $n$ is the integer 1 or 3, and $R_1$ is hydrogen or ethyl.

In accordance with the invention, amidoxime compounds in which $R_1$ represents hydrogen are produced by reacting a nitrile compound of formula $$RO-(CH_2)_n-CN$$

under anhydrous conditions with hydroxylamine, R and $n$ having the same significance set forth above. The temperature of the reaction is not critical. Preferably, the reaction is carried out at temperatures in the range from 30 to 80° C. and for best results at 60 to 70° C. In the preferred temperature range the reaction is ordinarily complete in from one to six hours. The reaction is favored by the use of an organic solvent such as a lower alkanol (e.g., methanol, ethanol, isopropanol), dimethylformamide, tetrahydrofuran, ethylene glycol and the like and mixtures of such solvents. Since hydroxylamine itself is relatively unstable, it is preferably supplied to the reaction mixture in the more stable acid addition salt form, the free base hydroxylamine being generated in situ in the reaction mixture by incorporating therein a sufficient quantity of a base which is stronger than hydroxylamine. Among the many bases which are suitable for this purpose, there may be mentioned by way of illustration alkali metal alkoxides, such as sodium methoxide, alkali metal bicarbonates such as sodium bicarbonate, tertiary amines such as triethylamine, and the like. Although substantially equivalent quantities of the reactants can be used satisfactorily in carrying out the reaction, for reasons of economy an excess of hydroxylamine is ordinarily employed.

Also in accordance with the invention, amidoximes having the formula first specified above in which $R_1$ represents an ethyl group, that is, the O-ethyl amidoximes, are produced by reacting an ethyl ester with an amidoxime of the same formula in which $R_1$ represents a hydrogen atom, R and $n$ having the same significance given above. The reaction is carried out under anhydrous conditions in the presence of a basic medium and is favored by the use of an inert organic solvent. Among the several basic media which can be employed, the alkali metal alkoxides such as sodium ethoxide are preferred. As solvents one may suitably employ aliphatic ketones such as acetone, methylethyl ketone, diethyl ketone and the like, ethers such as isopropyl ether, dioxane, tetrahydrofuran and the like, and hydrocarbons such as benzene, toluene, xylene and the like. The preferred esters for the reaction are the ethyl halides such as ethyl iodide or bromide, ethyl sulfate and ethyl sulfonate; other reactive ethyl esters can also be employed. For convenience, the reaction is carried out at temperatures in the approximate range from 50 to 130° C. At lower temperatures the time required for completion of the reaction is unduly long whereas at higher temperatures there is a tendency toward decomposition of the desired product thereby lowering the yield. The preferred temperature range is 75–90° C. The proportion of reactants is not critical, but for reasons of economy an excess of the ethyl ester is ordinarily employed.

The products of the invention possess significant hypotensive activity and consequently have application when administered orally in suitable dosage form, in the treatment of hypertension and similar conditions. The product, 2-phenoxyacetamidoxime, particularly in acid addition salt form, is outstanding in this regard and is therefore preferred. For example, as determined by a standard pharmacological test, substantial lowering of abnormal blood pressure in the perinephritic rat is achieved with doses as low as 1.25 milligrams per kilogram.

The free base compounds of the invention, as indicated, form acid addition salts upon reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, malate, maleate, p-toluenesulfonate, gluconate, ascorbate, benzenesulfonate and sulfamate. The acid addition salts are conveniently formed by mixing the free base with at least an equivalent amount of the acid in a solvent in which the salt is insoluble, particularly after chilling, thereby permitting recovery of the desired salt as a solid phase. Whereas both the free base and salt forms of the product are useful for the purposes of the invention, the salts are generally preferred in those cases where increased stability and water solubility are desirable. The invention contemplates the acid salts broadly. Those salts which are unsuited to particular uses, as for example uses in which toxicity is a problem, nevertheless have utility as intermediates, being readily convertible to the free base form or the non-toxic acid salts by means which per se are known to those in the art.

The invention is illustrated by the following examples.

*Example 1*

A solution of hydroxylamine hydrochloride (73 g.) in methanol (250 ml.) is added to a stirred solution of sodium methoxide (57 g.) in methanol (250 ml.), following which 130 g. of phenoxyacetonitrile [J.A.C.S., 42, 655 (1920)] is added dropwise. The resulting mixture is heated under reflux for 3 hours following which substantially all of the methanol is removed from the reaction mixture by distillation under reduced pressure. The residue is taken up in ether and the ethereal solution is washed twice with water, dried over sodium sulphate, and filtered. The free base product, 2-phenoxyacetamidoxime, is obtained as the residue resulting from evaporation of ether from the ethereal solution; M.P., 90–91° C. after recrystallization from benzene-petroleum ether mixture.

The hydrochloride salt, 2-phenoxyacetamidoxime hydrochloride, is obtained as the precipitate formed by adding to an ethereal solution of the free base an excess of methanol saturated with dry hydrogen chloride; after collection and recrystallization from ethanol-ether mixture, the product melts at 159–160° C. A water-soluble hydrobromide is obtained by treating an ethereal solution of the free base with an equivalent of hydrogen bromide in isopropyl alcohol; after recrystallization from a mixture of ethanol and ether this salt melts at 163–164° C. A water-soluble sulphate salt is obtained by mixing a methanolic solution of the free base with one equivalent of sulfuric acid in methanol; M.P. 108–109° C. after recrystallization from ethanol-ether mixture.

*Example 2*

(a) Sodium bicarbonate powder (50 g.) is added portionwise over a period of one hour to a stirred, refluxing solution of hydroxylamine (35 g.) and 2,6-xylyloxyacetonitrile (80 g.). The solution is maintained under reflux for 3 hours further, then cooled, taken up in ether and the ethereal solution washed with water and dried over sodium sulphate. An excess of methanolic hydrogen chloride is added to the solution and the resulting precipitate, 2-(2,6-xylyloxy)acetamidoxime hydrochloride, is recovered by filtration and recrystallized from ethanol-ether mixture; M.P. 178–180° C. The free base product 2-(2,6-xylyloxy)acetamidoxime, is obtained as the residue remaining after evaporation of the solvent from the ethereal solution described above.

(b) The following procedure for the preparation of the starting material, 2,6-xylyloxyacetonitrile, is illustrative of a general procedure which may be used for the production of the nitrile starting materials of the invention. Chloroacetonitrile (40 g.) is added over an hour to a stirred suspension of anhydrous potassium carbonate (69 g.) in acetone (200 ml.) and 2,6-xylenol (61 g.). The mixture is heated at reflux temperature for three hours, cooled, filtered, and the filtrate evaporated to dryness. The residue is taken up in ether (300 ml.) and the ethereal solution is washed three times with equal portions of 10% aqueous sodium hydroxide solution and dried over sodium sulphate. The dry solution is distilled under reduced pressure, 2,6-xylyloxyacetonitrile being recovered as the fraction boiling at 72–73° C. (0.3 mm.).

(c) In accordance with the procedure of 2(a) and using corresponding proportions of hydroxyamine and one of the following nitriles, one can obtain the following amidoxime products (listed according to melting point as the hydrochloride salt):

| Nitrile | Amidoxime Hydrochloride (M.P., ° C., from ethanol-ether) |
|---|---|
| 3-ethylphenoxyacetonitrile; B.P., 83–84° C./0.3 mm. | 2-(3-ethylphenoxy)acetamidoxime, 169–170. |
| 4-chloro-o-tolyloxyacetonitrile; B.P., 140–143° C./0.3 mm. | 2-(4-chloro-o-tolyloxy)acetamidoxime, 167–168. |
| 2-chlorophenoxyacetonitrile; B.P., 89° C./0.3 mm. | 2-(2-chlorophenoxy)acetamidoxime, 133–134. |
| 2,3-dichlorophenoxyacetonitrile; M.P., 95–96° C. | 2-(2,3-dichlorophenoxy)acetamidoxime, 164–165. |
| 2,4-dichlorophenoxyacetonitrile; British Patent No. 716,866. | 2-(2,4-dichlorophenoxy)acetamidoxime, 167. |
| 2,6-dichlorophenoxyacetonitrile; M.P., 40–43° C. | 2-(2,6-dichlorophenoxy)acetamidoxime, 160–161. |
| α,α,α-trifluoro-m-tolyloxy-acetonitrile; B.P., 76–78° C./0.3 mm. | 2-(α,α,α-trifluoro-m-tolyloxy)acetamidoxime, 184–185. |
| 2-methoxyphenoxyacetonitrile; B.P., 80–82° C./0.4 mm. | 2-(2-methoxyphenoxy)acetamidoxime, 125–126. |
| 4-phenoxybutyronitrile; Ber., 24, 2640. | 4-phenoxybutyramidoxime, 208–209. |

Example 3

2-phenoxyacetamidoxime (5 g.) is added to sodium ethoxide produced by dissolving sodium (0.7 g.) in ethanol (50 ml.) and the resulting mixture is evaporated to dryness under reduced pressure. The solid residue is suspended in methylethyl ketone (50 ml.) containing ethyl iodide (7.1 g.) and the mixture is refluxed for one hour. The solvent is removed under reduced pressure and the residue extracted with ether. The ether extract is distilled under reduced pressure and the free base product, O-ethyl-2-phenoxyacetamidoxime, collected as the fraction boiling at 87° C. (0.3 mm.). A water-soluble hydrochloride is obtained by treating a solution of the free base in a small quantity of isopropyl alcohol with an equivalent of hydrogen chloride in isopropyl alcohol, and precipitating the desired salt by addition of ether. Similarly, the citrate salt is obtained by mixing a solution of the free base in methanol with a methanolic citric acid solution and concentrating the mixture until the desired salt separates as a solid phase.

I claim:

1. A member of the group consisting of amidoximes and acid addition salts thereof, said amidoximes having the formula $RO-(CH_2)_n-C(NH_2)=NOR_1$ where R is a member of the group consisting of phenyl, 3-ethylphenyl, 2,6-xylyl, 2-methoxyphenyl, α,α,α-trifluoro-m-tolyl, 4-chloro-o-tolyl, 2-chlorophenyl, 2,3-dichlorophenyl, 2,4-dichlorophenyl and 2,6-dichlorophenyl, $n$ is an odd integer of 1 to 3, and $R_1$ is a member of the group consisting of hydrogen and ethyl.

2. 2-phenoxyacetamidoxime.

3. 2-phenoxyacetamidoxime hydrochloride.

4. An acid addition salt of 2-phenoxyacetamidoxime.

5. 2-(2,6-xylyloxy)acetamidoxime hydrochloride.

6. 2-(4-chloro-o-tolyloxy)acetamidoxime hydrochloride.

7. 2-(2-chlorophenoxy)acetamidoxime hydrochloride.

8. 2-(2,6-dichlorophenoxy)acetamidoxime hydrochloride.

9. 2-(2-methoxyphenoxy)acetamidoxime hydrochloride.

10. O-ethyl-2-phenoxyacetamidoxime.

References Cited in the file of this patent

UNITED STATES PATENTS

| 1,792,770 | Sebrell et al. | Feb. 17, 1931 |
| 2,387,323 | Gaynor et al. | Oct. 23, 1945 |
| 2,791,611 | Donaruma | May 7, 1957 |
| 2,832,804 | Richter et al. | Apr. 29, 1958 |
| 2,947,782 | De Benneville et al. | Aug. 2, 1960 |

FOREIGN PATENTS

| 452,354 | Canada | Nov. 2, 1948 |